US010417079B2

(12) United States Patent
Zasadzinski et al.

(10) Patent No.: US 10,417,079 B2
(45) Date of Patent: Sep. 17, 2019

(54) FAULT TOLERANT ROOT CAUSE ANALYSIS SYSTEM

(71) Applicant: CA, INC., New York, NY (US)

(72) Inventors: Michal Zasadzinski, Barcelona (ES); Marc Sole Simo, Barcelona (ES); Victor Muntes Mulero, Barcelona (ES)

(73) Assignee: CA, Inc., New York, NY (US)

( * ) Notice: Subject to any disclaimer, the term of this patent is extended or adjusted under 35 U.S.C. 154(b) by 156 days.

(21) Appl. No.: 15/485,848

(22) Filed: Apr. 12, 2017

(65) Prior Publication Data

US 2018/0285181 A1 Oct. 4, 2018

(30) Foreign Application Priority Data

Mar. 30, 2017 (ES) .................................. 201700338

(51) Int. Cl.
*G06F 11/00* (2006.01)
*G06F 11/07* (2006.01)
*G06N 5/04* (2006.01)

(52) U.S. Cl.
CPC ........ *G06F 11/079* (2013.01); *G06F 11/0709* (2013.01); *G06F 11/0766* (2013.01); *G06N 5/048* (2013.01)

(58) Field of Classification Search
CPC ............... G06F 11/079; G06F 11/0721; G06F 11/0709; G06F 11/0793; G06F 11/3006; G06N 5/048
See application file for complete search history.

(56) References Cited

U.S. PATENT DOCUMENTS

| 5,964,891 A | 10/1999 | Caswell et al. |
| 6,199,018 B1 | 3/2001 | Quist et al. |
| 7,203,742 B1 | 4/2007 | Luft et al. |
| 2003/0065986 A1* | 4/2003 | Fraenkel ............ G06F 11/3006 714/47.2 |
| 2006/0136104 A1 | 6/2006 | Brozovich et al. |

(Continued)

OTHER PUBLICATIONS

W. Gong, K. Liu, Y. Liu, X. Zhao and M. Gu, "Directional diagnosis for wireless sensor networks," 2011 International Conference on Distributed Computing in Sensor Systems and Workshops (DCOSS), Barcelona, 2011, pp. 1-8.

(Continued)

*Primary Examiner* — Joseph D Manoskey
(74) *Attorney, Agent, or Firm* — Shook, Hardy & Bacon L.L.P.

(57) ABSTRACT

Embodiments of the present disclosure relate to a fault tolerant root cause analysis (RCA) system that is able to handle calculation failures during runtime. Calculations (e.g., evaluation of a diagnostic model for a specific component or device) that are performed during the RCA are integrated using different resources of the system under analysis. In order to make a final diagnosis, the resources exchange messages containing calculation inputs and outputs. Calculation problems due to calculation failures in a particular resource can be resolved efficiently which reduces resource utilization and minimizes failure propagation to other parts of the system. Accordingly, the system is able to recover and output a diagnosis even if some of the resources fail or generate problems.

20 Claims, 6 Drawing Sheets

(56) References Cited

U.S. PATENT DOCUMENTS

| | | | | |
|---|---|---|---|---|
| 2010/0318855 A1* | 12/2010 | Beg | ................ | G06F 11/079 |
| | | | | 714/39 |
| 2014/0298091 A1* | 10/2014 | Carlen | ................ | H04L 65/80 |
| | | | | 714/15 |
| 2015/0248319 A1* | 9/2015 | Nagai | ................ | G06F 11/0709 |
| | | | | 714/37 |
| 2018/0101426 A1* | 4/2018 | Cunico | ................ | G06F 11/079 |

OTHER PUBLICATIONS

I. Katzela and A.T. Bouloutas. "Centralized vs Distributed Fault Localization", 1995, 12 pages. Available at: https://link.springer.com/content/pdf/10.1007%2F978-0-387-34890-2_22.pdf.

Akka Scala Documentation, Release 2.4.20, Lightbend Inc., Jun. 12, 2017, 662 pages. (uploaded in two parts).

* cited by examiner

FAULT TOLERANT ROOT CAUSE ANALYSIS SYSTEM

RELATED APPLICATION

This application claims priority to Spanish Application No. P201700338, filed Mar. 30, 2017.

BACKGROUND

The growing complexity of large infrastructures, such as datacenters, frequently hinders the understanding of the system behavior. System administrators frequently analyze metrics extracted from components of the system, relationships between components of the system, as well as the overall system itself. Root cause analysis (RCA) systems enable system administrators to identify the cause of a particular failure in a monitored system. The RCA system performs calculations (e.g., evaluations of diagnostic models for specific components or devices) that enable the RCA system to detect a failure and identify its cause.

Failures of a component may have different characteristics. For example, the failure could be a single component failure, a multi-component failure, a local failure, or another type of failure. When a failure prevents the RCA system from performing calculations, the consequence is the inability to output the diagnosis of the monitored system. Examples of failures may include the device is out of network coverage, the device has insufficient power, a regional or global network overload, lack of resources (which may cause complex calculations to fail), and the like.

Even when the failure is not located in a particular component or device (a "resource"), the diagnostic model for the particular component or device may depend on input from another device or component that may have failed. In current RCA systems, the entire diagnostic process may be restarted to enable the missing calculation to be performed. However, a full restart is inefficient and consumes too many resources (e.g., computer memory, CPU, or energy).

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to a fault tolerant RCA system. More particularly, the present disclosure provides a RCA system that is able to handle calculation failures during runtime. To do so, calculations (e.g., evaluations of diagnostic models for specific devices) that are performed during the RCA are integrated using different resources of the system under analysis. In order to make a final diagnosis, the resources exchange messages containing calculation inputs and outputs. Calculation problems due to calculation failures in a particular resource can be resolved efficiently which reduces resource utilization and minimizes failure propagation to other parts of the system. Accordingly, the system is able to recover and output a diagnosis even if some of the resources fail or generate problems.

BRIEF DESCRIPTION OF THE DRAWINGS

The present invention is described in detail below with reference to the attached drawing figures, wherein.

DETAILED DESCRIPTION

Figure 1:
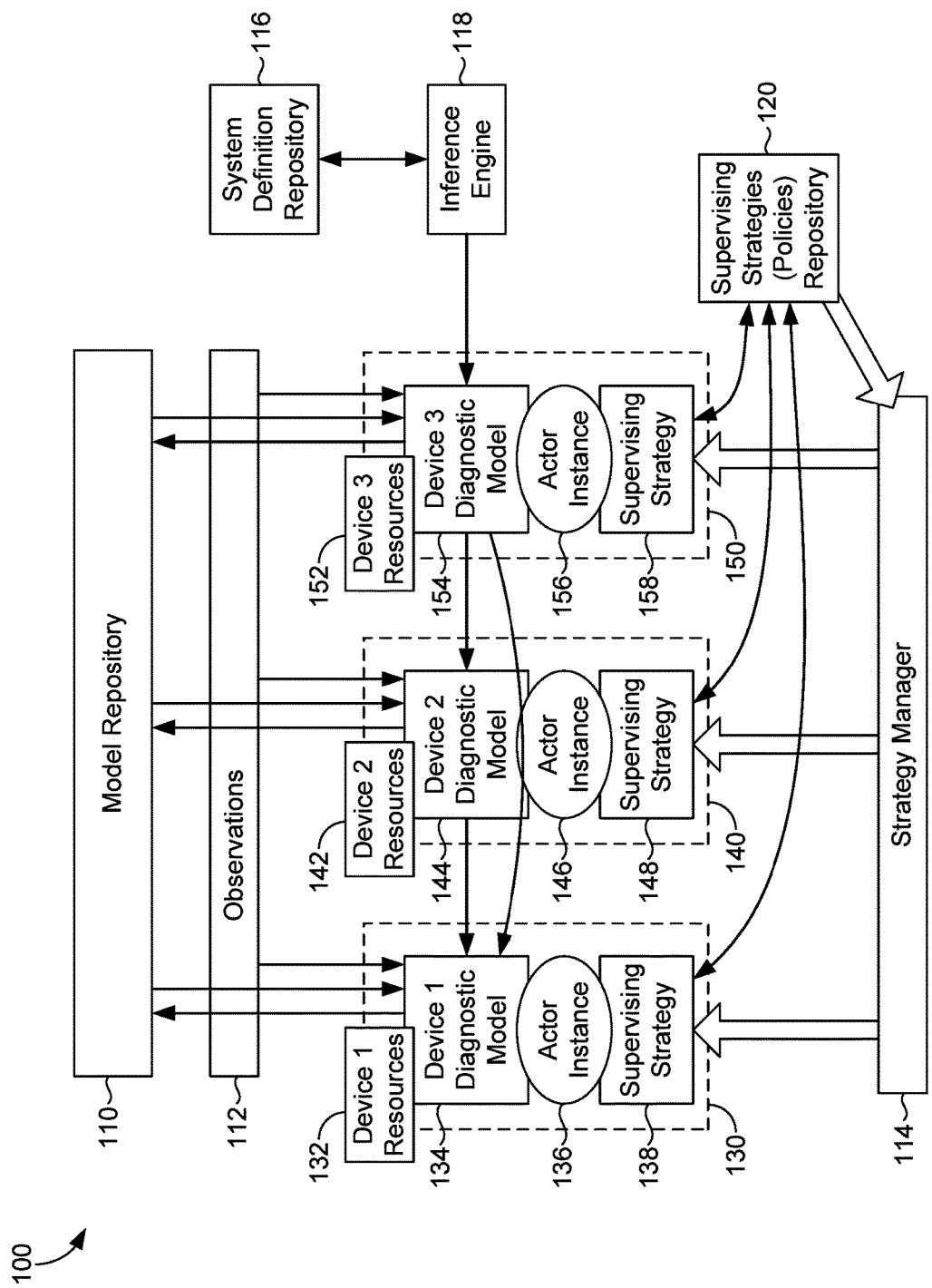
FIG. 1 is a block diagram showing a fault tolerant RCA system that that is able to handle calculation failures during runtime, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to performing a fault tolerant RCA on a distributed system that matches an Internet of Things (IoT) scenario, it could also be applied to perform a fault tolerant RCA on a datacenter or any distributed system in general.

Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

As noted in the background, the growing complexity of large infrastructures, such as datacenters, frequently hinders the understanding of the system behavior. System administrators frequently analyze metrics extracted from components of the system, relationships between components of the system, as well as the overall system itself. RCA systems enable system administrators to identify the cause of a particular failure in a monitored system. The RCA system performs calculations (e.g., evaluations of diagnostic models for specific components or devices) that enable the RCA system to detect a failure and identify its cause.

Failures of a component may have different characteristics. For example, the failure could be a single component failure, a multi-component failure, a local failure, or another type of failure. When a failure prevents the RCA system from performing calculations, the consequence is the inability to output the diagnosis of the monitored system. Examples of failures may include the device is out of network coverage, the device has insufficient power, a regional or global network overload, lack of resources (which may cause complex calculations to fail), and the like. Even if the calculation failure is not located in a particular component or device, the diagnostic model for the particular component or device may depend on input from another device or component that may have failed. In current RCA systems, the entire diagnostic process may be restarted to enable the missing calculation to be performed. However, a full restart is inefficient and consumes too many resources (e.g., computer memory, CPU, or energy).

Embodiments of the present disclosure relate to a fault tolerant RCA system that is able to handle calculation failures during runtime. Calculations (e.g., evaluation of a diagnostic model for a specific component or device) that are performed during the RCA are integrated using different resources of the system under analysis. Accordingly, the system is able to recover and output a diagnosis even if some of the resources fail or generate problems.

To do so, the present disclosure describes an RCA system that works on distributed devices and uses the distributed devices as resources for evaluating the calculations. In order to make a final diagnosis, the resources exchange messages containing calculation inputs and outputs. This enables the RCA system to handle failures more effectively. For example, calculation problems due to calculation failures in a particular resource are resolved efficiently which reduces resource utilization and minimizes failure propagation to other parts of the system.

Accordingly, one embodiment of the present disclosure is directed to a method of utilizing a supervising strategy to mitigate a fault in the RCA. The method comprises providing, by a strategy manager, a supervising strategy for root cause analysis of a distributed system to a plurality of child devices. Each child device comprises a diagnostic model, an actor instance, and the supervising strategy. The method also comprises enabling communications, via an actor messaging protocol of the actor instance that is isolated from the diagnostic model, for the plurality of child devices. The communications comprise calculations made by the diagnostic model. The method further comprises, based on the communications, identifying a fault in the root cause analysis for one of the plurality of child devices. The method also comprises, upon the one of the plurality of child devices applying the supervising strategy, making a final diagnosis for the RCA of the distributed system.

In another embodiment of the present disclosure is directed to a method applying a supervising strategy at a child device to mitigate a fault during RCA. The method comprises receiving, at a child device, a supervising strategy for root cause analysis of a distributed system comprising a strategy manager and a plurality of child devices. The child device comprises a diagnostic model, an actor instance, and the supervising strategy. The method also comprises communicating, via an actor messaging protocol of the actor instance that is isolated from the diagnostic model, calculations made by the diagnostic model to the strategy manager. The method further comprises based on the strategy manager identifying a fault in the root cause analysis for one of the plurality of child devices, applying the supervising strategy to mitigate the fault and provide fault tolerance in the root cause analysis.

In yet another embodiment, the present disclosure is directed to a computerized system that provides a fault tolerant RCA system that that is able to handle calculation failures during runtime. The system includes a processor and a non-transitory computer storage medium storing computer-useable instructions that, when used by the processor, cause the processor to provide, by a strategy manager, a supervising strategy for root cause analysis of a distributed system to a plurality of child devices. Each child device comprises a diagnostic model, an actor instance, and the supervising strategy. Communications are enabled, via an actor messaging protocol of the actor instance that is isolated from the diagnostic model, for the plurality of child devices. The communications comprise calculations made by the diagnostic model. Based on the communications received via the actor messaging protocol, a fault in the root cause analysis is identified for a child device of the plurality of child devices. The fault indicates missing calculations or a failed or disconnected child device. The supervising strategy is applied to restart calculations, manage device shutdown of the child device, or move calculation execution from the child device to another child device of the plurality of child devices device.

Referring now to FIG. 1, a block diagram is provided that illustrates a RCA system 100 that provides fault tolerant RCA, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The RCA system 100 may be implemented via any type of computing device, such as computing device 600 described below with reference to FIG. 6, for example. In various embodiments, the RCA system 100 may be implemented via multiple devices cooperating in a distributed environment.

The RCA system 100 generally operates to provide fault tolerance during RCA. As shown in FIG. 1, the RCA system 100 comprises, among other components not shown, model repository 110, observations 112, strategy manager 114, system definition repository 116, inference engine 118, supervising strategies repository 120, and devices 130, 140, 150. It should be understood that the RCA system 100 shown in FIG. 1 is an example of one suitable computing system architecture. Each of the components shown in FIG. 1 may be implemented via any type of computing device, such as computing device 600 described with reference to FIG. 6, for example The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of datacenters, monitoring tools, or historical databases may be employed by the RCA system 100 within the scope of the present disclosure. Each may comprise a single device or multiple devices cooperating in a distributed environment. For instance, the RCA system 100 may be provided via multiple devices arranged in a distributed environment that collectively provide the functionality described herein. Additionally, other components not shown may also be included within the network environment.

Generally, the RCA system includes systems working on diagnostic models and using distributed computational resources as illustrated in FIG. 1. A model repository 110 comprises device diagnostic models which can be encoded in different mathematical structures. For example, the diagnostic models may be rule-based, Bayesian network based, etc.

The diagnostic models 134, 144, 154 corresponding to each device 130, 140, 150 are responsible for performing the calculations with resource(s) 132, 142, 152 of the device(s) 130, 140, 150 as part of the RCA. As described herein, the diagnostic models 134, 144, 154 are separate from the actor instances 136, 146, 156 in each device 130, 140, 150. This enables the actor instance to communicate with other components in the system 100 even when the corresponding diagnostic model is experiencing calculation failures.

Observations 112 represent a current state of the environment and the devices. Observations 112 contain events and metrics and are the input to the diagnostic models. For instance, a diagnostic model of a device can be evaluated based on a physical state of the environment (e.g., temperature, pressure) and measurements taken by the device (e.g., device's temperature, battery load). Observations 112 can also contain information about events that occurred in the environment (e.g., some device has been disconnected).

The strategy manager 114 generally operates to provide supervising strategies stored in the supervising strategies repository 120 to each device 130, 140, 150. As can be appreciated, each device may have a different supervising strategy. For example, based on the device type, location, connection to other devices, or some other criteria, the device may have a supervising strategy that is tailored to that specific device type, location, connection to other devices, or some other criteria.

Generally, the system definition repository 116 defines the order and details of evaluation of the diagnostic process. For example, some device diagnostic models may receive as input the output from other device diagnostic models. Accordingly, any modifications to supervising strategies needs to consider the order and details of evaluation of the diagnostic process as provided by the system definition repository 116. As illustrated, once provided by the strategy manager 114, the supervising strategies 138, 148, 158 are encoded in each device 130, 140, 150.

The inference engine 118 generally operates to evaluate and manage the calculations. Upon receiving calculations, the inference engine 118 makes a final diagnosis for the RCA of the system 100. If calculations are missing, the inference engine 118 may communicate with the system definition repository 116 to determine which calculations are missing or where in the order of the current evaluation the failure occurred.

In practice, it can be generally assumed that large distributed systems are constantly providing a stream of metrics (i.e., the observations). The metrics may be received directly from a monitored component or in a processed stream (e.g., a stream of alarms or anomalies detected in the metrics). The system 100 is diagnosed utilizing a message passing algorithm (e.g., Pearl's loopy belief propagation) and evaluated using resources within the system (e.g., resources 132, 142, 152 of each device 130, 140, 150).

In order to make a final diagnosis, the resources 132, 142, 152 exchange messages that may comprise calculation inputs and calculation outputs. For example, the input of a calculation evaluated on a device 130, 140, 150 may be data received from the stream of metrics or data received as output of another device calculation. The output is associated with a diagnostic model type (e.g., conditional probability or state variable values).

During evaluation, a calculation failure may occur. For example, the calculation resources 132, 142, 152 may be exhausted, which leads to errors during the evaluation. In traditional RCA systems, this prevents the RCA calculations from completing and the entire calculation process would likely need to be restarted. However, the RCA of the present disclosure utilizes the predefined calculation supervision strategies which can be stored in the supervising strategies repository 120.

In some embodiments, a supervising strategy may be very simple (e.g., performed calculations should be restarted in the device where the calculation failure occurred). In other embodiments, more complex supervising strategies can be used. For example, in a case where calculation failure in a whole subset of devices occurs (e.g., two devices of the same type or having common geolocation), a restart may be performed according to the subset. In any case, the strategy manager decides which particular strategy should be applied to each device.

Furthermore, the strategy manager 114 may coordinate dynamic strategy changes to respond to new situations. For example, the strategy manager may replace strategies for particular devices with another strategy that is working better in the current environment (such as in another device). One example may be in a system where sensors are connected to different gateways. Some of the sensors may have a common geolocation and similar network coverage. In these conditions, while the calculations may fail because of network issues, the executed strategy should not only consider the type of device and its place in the hierarchy of the system, but also its location. Thus, the execution of an appropriate strategy may help to manage calculation failures effectively.

The supervision strategies define types of actions which can be implemented by a supervisor and applied to supervised devices in the event of calculation failure in a particular portion of the system. Accordingly, the supervising device is referred to as a parent of the supervised devices, which are referred to as subordinates. The parent and the subordinates comprise a hierarchical structure. Thus, each supervising strategy defines circumstances of a calculation failure and a group of subordinates that can apply the supervising strategy to resolve the calculation failure.

During the calculation execution and supervising strategy application, devices interact with each other using an actor messaging protocol. The protocol provides asynchronous and parallel communication in a hierarchical actor system which is critical for handling failures during the calculations. Accordingly, each device 130, 140, 150 in the system 100 is represented by an actor instance 136, 146, 156. Each actor instance can load and synchronize supervising strategies from the supervising strategy repository 120.

The actor instances corresponding to each device enable communication with the environment through the actor messaging protocol. In the case of calculation failures, the supervision module in each actor instance applies strategies and maintains hierarchical message delivery based on the predefined model hierarchy. Moreover, supervising strategies are loaded from the supervising strategy repository 120 and are encoded in the instances. Thus, they can be executed immediately so there is no need to wait for a response from the supervising strategy repository 120, allowing the supervising strategies to be executed much faster.

Figure 2:
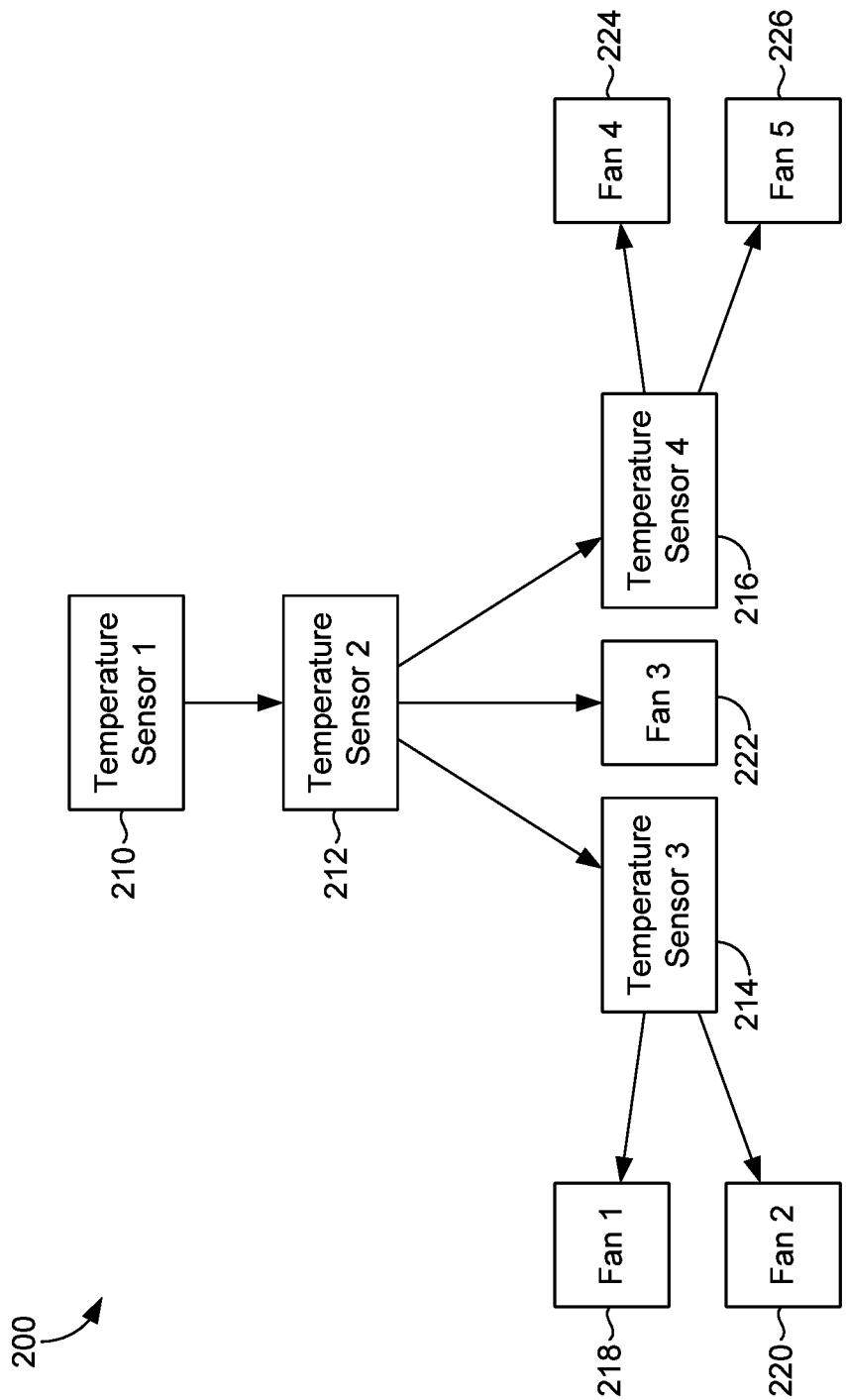
FIG. 2 is an exemplary system, in accordance with an embodiment of the present disclosure.

With reference to FIG. 2, an exemplary system is illustrated, in accordance with an embodiment of the present disclosure. The system comprises a network of intelligent temperature sensors (e.g., temperature sensor 1 210, temperature sensor 2 212, temperature sensor 3 214, and temperature sensor 4 216) and cooling equipment (e.g., fan 1 218, fan 2 220, fan 3 222, fan 4 224, and fan 5 226). The devices (the temperature sensors and fans), which are part of the control system, exchange data containing measured temperature of some localization. A broken connectivity can be an example of a fault in this system. The possible cause could be internal, such as a sensor problem (e.g., dead battery) or external, such as poor network coverage. The specific diagnostic model for each device type may be defined in a model repository (such as the model repository 110 described above with respect to FIG. 1) and designated for evaluation during the RCA. If a failure occurs in temperature sensor 2 212, for example, temperature sensor 2 212 may not perform diagnostics correctly (part of the calculations that determine the result of RCA), then the RCA system can use its strategy manager (such as the strategy manager 114 described above with respect to FIG. 1) to handle this failure. For instance, the strategy may be changed because of constantly failing diagnostic calculations, which cannot be finished successfully with the current strategy. Consequently, the strategy manager may modify the supervising strategy to include resetting the calculations in temperature sensor 3 214, temperature sensor 4 216, and fan 3 222. Performing these operations in the system may help to avoid incoherence (e.g., outdated results of the RCA, system block, or even its termination).

Figure 3:
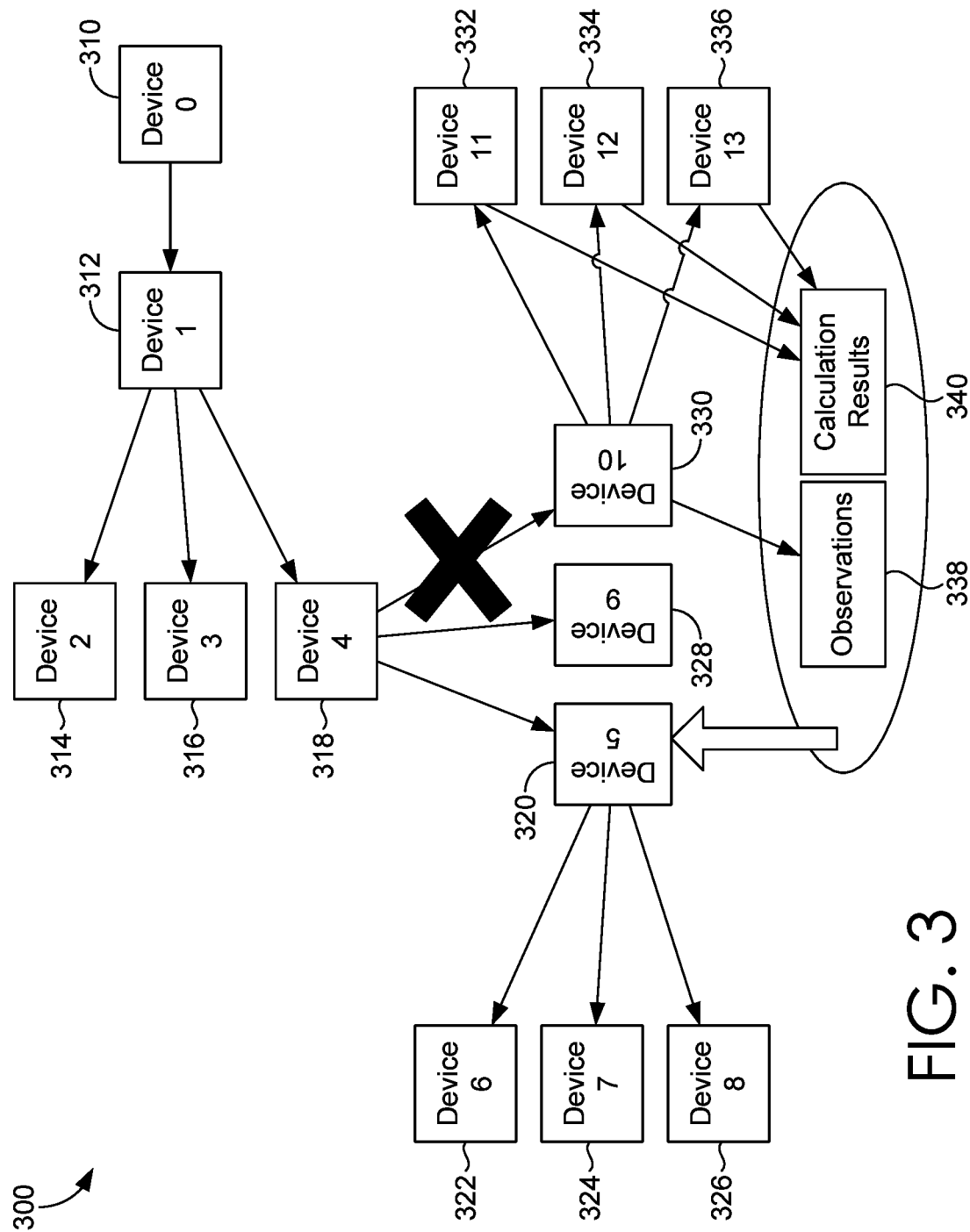
FIG. 3 is an exemplary system, in accordance with an embodiment of the present disclosure.

Turning now to FIG. 3, an exemplary system is illustrated, in accordance with an embodiment of the present disclosure. In this example, device 5 320 and device 10 330 are the same type (e.g., type A). Additionally, device 6, 322, device 7 324, and device 8 326 are the same type (e.g., type B) as device 11 332, device 12, 334, and device 13 336. Device 0 310 and Device 1 312 may not be the same type as any device in the system. Assume that, for example, the RCA calculations performed on Device 10 330 are frequently failing or restarting. Consequently, the exact diagnosis of the whole system cannot be produced, is invalid, or is outdated.

The source of the problem with Device 10 330 may be a lack of some resource (e.g., dead battery, exceeding operational memory, or an overloaded CPU is not providing sufficient calculation power). The supervising strategy defined in the system may be: "Find a Device X in the system which is the same type, as the problematic Device Y, and use: (1) its resources; (2) its diagnostic model (which is part of the diagnostic model of the whole system and is evaluated on that device X); (3) observations 338 (which contain metrics and events associated with Device Y) provided for Device Y; and (4) results of evaluated calculations of children of Device Y to evaluate calculations. Then, propagate the results in the system, as the output of Device Y."

Following the above example, the supervising strategy may be encoded in Device 4 318 which is the supervisor of Device 5 320, device 9 328, and device 10 330. Device 4 318 executes this policy. When the supervising mechanism applies the supervising strategy, the system reruns calculations on Device 5 320 instead of running them on Device 10 330. During the evaluation, observations 338 (i.e., observations associated with Device 10 330) are used as the input, and the output is communicated to Device 4 318. Finally, Device 4 318 is able to calculate the diagnosis using calculation results 340 provided by children of failing Device 10 330, successfully mitigating the fault at failing Device 10 330.

Figure 4:
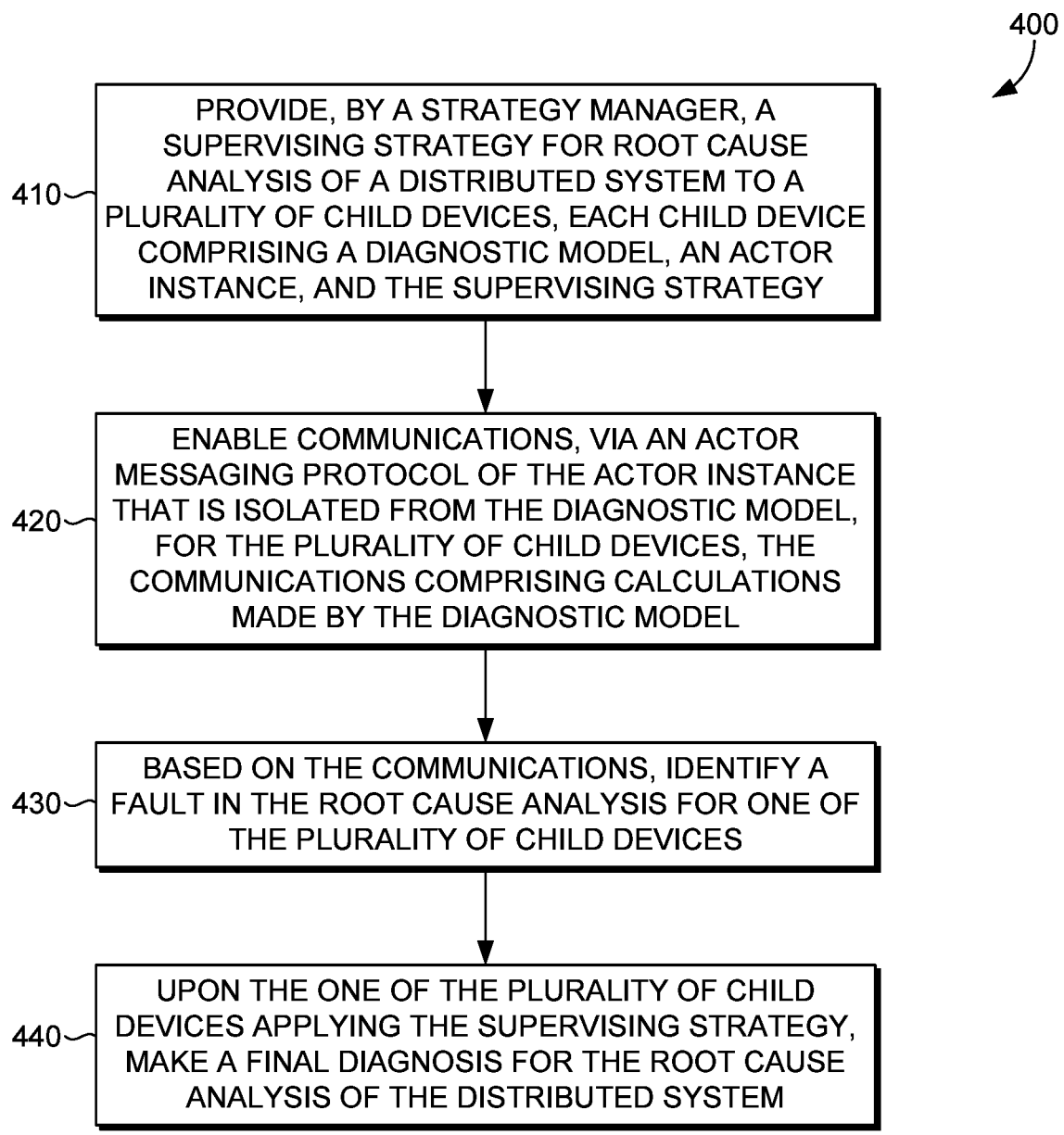
FIG. 4 is a flow diagram showing a method of utilizing a supervising strategy to mitigate a fault in the RCA, in accordance with embodiments of the present disclosure.

Referring now to FIG. 4, a flow diagram is provided that illustrates a method 400 of utilizing a strategy manager to mitigate a fault in the RCA, in accordance with embodiments of the present disclosure. For instance, the method 400 may be employed utilizing the RCA system 100 of FIG. 1. As shown at step 410, a supervising strategy is provided by a strategy manager to a plurality of child devices for RCA of a distributed system. Each child device comprises a diagnostic model, an actor instance, and the supervising strategy. In embodiments, the distributed system is a hierarchical actor based system.

Communications are enabled, at step 420, via an actor messaging protocol of the actor instance for the plurality of child devices. In embodiments, the actor messaging protocol provides asynchronous and parallel communication between the manager and the plurality of child devices in a hierarchical structure. The actor instance is isolated from the diagnostic model. The diagnostic model may be received from a model repository and encoded in a mathematical structure.

The communications may comprise calculations made by the diagnostic model (e.g., rule-based, Bayesian network based, etc.). The calculations may be provided asynchronously to an inference engine for evaluation and management. Input to the diagnostic model may comprise data coming from a stream of metrics of the child device. Additionally, or alternatively, input to the diagnostic model may comprise data coming from an output of another child device.

Based on the communications, a fault in the RCA is identified, at step 430, for one of the plurality of child devices. For example, the fault may indicate missing calculations or a failed or disconnected child device.

Upon the one of the plurality of child devices applying the supervising strategy, a final diagnosis for the RCA of the distributed system is made, at step 440. The strategy manager may comprise a repository of supervising strategies. The supervising strategies define circumstances of a fault and the child devices included in the application of the supervising strategy. The strategy manager may dynamically update the supervising strategy to respond to a current state of the distributed system. In this regard, the supervising strategy may be dynamically updated by the strategy manager at runtime. In some embodiments, a system definition repository defines an order and details of an evaluation of diagnostic processes and device resources used to perform the calculations.

In some embodiments, the supervising strategies comprise restarting calculations. Calculations may be restarted only on failed or disconnected child devices. Alternatively, calculations may be restarted for all devices. The supervising strategies may comprise managing device shutdown. The supervising strategies may comprise moving calculation execution from a failed child device to another child device.

Figure 5:
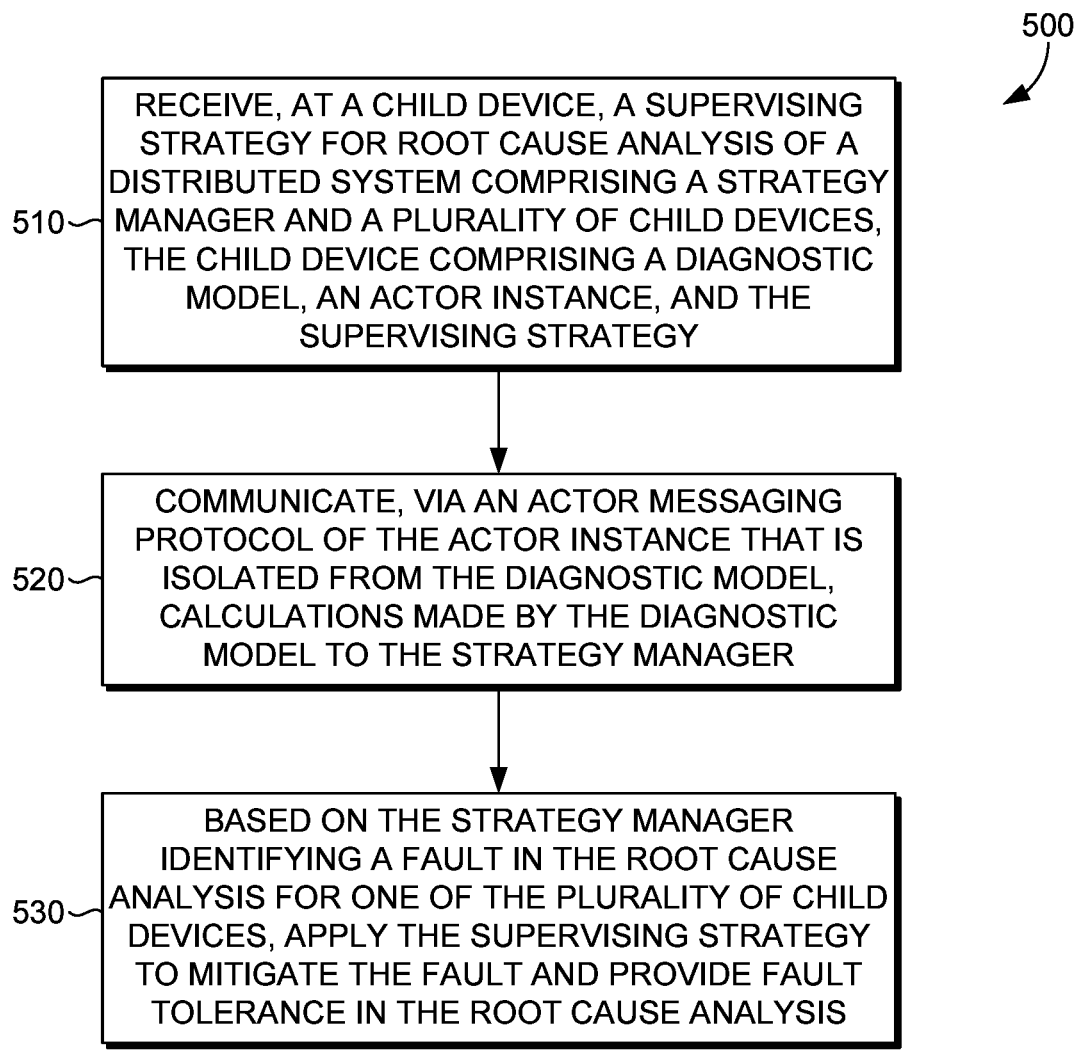
FIG. 5 is a flow diagram showing a method of applying a supervising strategy at a child device to mitigate a fault during RCA, in accordance with embodiments of the present disclosure.

In FIG. 5, a flow diagram is provided that illustrates a method 500 of applying a supervising strategy at a child device to mitigate a fault during RCA, in accordance with embodiments of the present disclosure. For instance, the method 500 may be employed utilizing the RCA system 100 of FIG. 1.

As shown at step 510, a supervising strategy is received at a child device. The supervising strategy is utilized for RCA of a distributed system. The distributed system comprises a strategy manager and a plurality of child devices. Each child device comprises a diagnostic model, an actor instance, and the supervising strategy.

Calculations made by the diagnostic model are communicated, at step 520, via an actor messaging protocol of the actor instance that is isolated from the diagnostic model, to the strategy manager.

Based on the strategy manager identifying a fault in the RCA for one of the plurality of child devices, a supervising strategy is applied, at step 530, to mitigate the fault and provide fault tolerance in the RCA.

Figure 6:
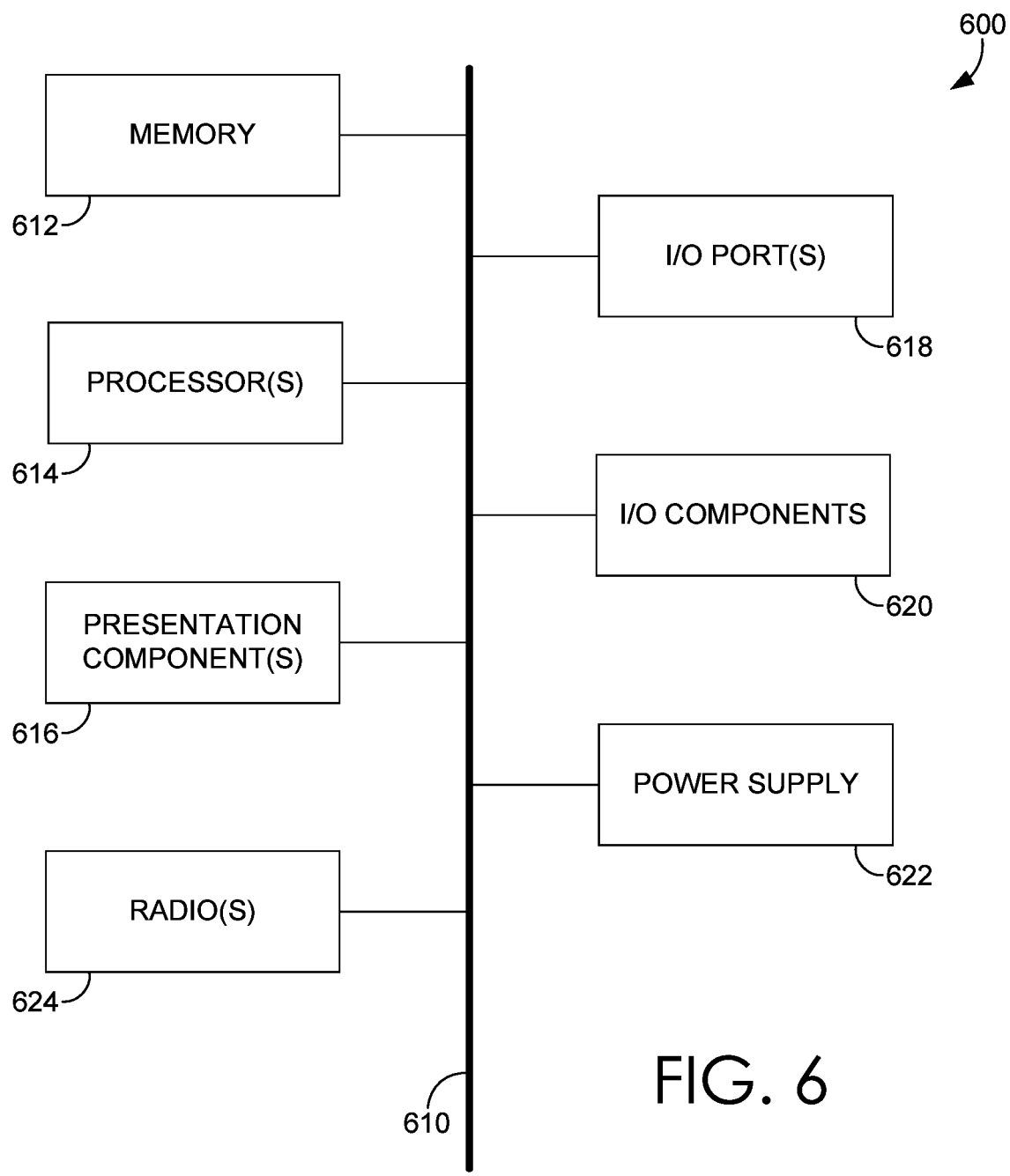
FIG. 6 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the inventive embodiments. Neither should the computing device 600 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output (I/O) components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present disclosure provide for an objective approach for providing a fault tolerant RCA system. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
providing, by a strategy manager, a supervising strategy for root cause analysis of a distributed system to a plurality of child devices, each child device comprising a diagnostic model, an actor instance, and the supervising strategy, wherein the supervising strategy is encoded at each child device;
enabling communications, via an actor messaging protocol of the actor instance that is isolated from the diagnostic model, for the plurality of child devices, the communications comprising calculations made by the diagnostic model;
based on the communications, identifying a fault in the root cause analysis for one of the plurality of child devices, the fault preventing a final diagnosis for the root cause analysis; and
applying, by the actor instance of the one of the plurality of child devices, the supervising strategy and making a final diagnosis for the root cause analysis of the distributed system.

2. The method of claim 1, wherein the fault indicates missing calculations or a failed or disconnected child device.

3. The method of claim 1, wherein the diagnostic model is received from a model repository and encoded in a mathematical structure.

4. The method of claim 1, wherein the calculations are provided asynchronously to an inference engine for evaluation and management.

5. The method of claim 1, wherein the system further comprises a system definition repository that defines an order and details of an evaluation of diagnostic processes and device resources used to perform the calculations.

6. The method of claim 1, wherein the distributed system is a hierarchical actor based system.

7. The method of claim 1, wherein the strategy manager comprises a repository of supervising strategies.

8. The method of claim 1, wherein input to the diagnostic model comprises data coming from a stream of metrics of the child device.

9. The method of claim 1, wherein input to the diagnostic model comprises data coming from an output of another child device.

10. The method of claim 1, wherein the supervising strategy defines circumstances of the fault and the child devices included in the application of the supervising strategy.

11. The method of claim 1, wherein the supervising strategy is dynamically updated by the strategy manager to respond to a current state of the distributed system.

12. The method of claim 1, wherein the supervising strategy is dynamically updated by the strategy manager at runtime.

13. The method of claim 1, wherein the supervising strategies comprise restarting calculations.

14. The method of claim 13, wherein calculations are restarted only on failed or disconnected child devices.

15. The method of claim 13, wherein calculations are restarted for all devices.

16. The method of claim 1, wherein the supervising strategies comprise managing device shutdown.

17. The method of claim 1, wherein the supervising strategies comprise moving calculation execution from a failed child device to another child device.

18. The method of claim 1, wherein the actor messaging protocol provides asynchronous and parallel communication between the manager and the plurality of child devices in a hierarchical structure.

19. A method comprising:
receiving, at a child device, a supervising strategy for root cause analysis of a distributed system comprising a strategy manager and a plurality of child devices, the child device comprising a diagnostic model, an actor instance, and the supervising strategy, wherein the supervising strategy is encoded on the child device;
communicating, via an actor messaging protocol of the actor instance that is isolated from the diagnostic model, calculations made by the diagnostic model to the strategy manager;
based on the strategy manager identifying a fault in the root cause analysis for one of the plurality of child devices, the fault preventing a final diagnosis for the root cause analysis and applying the supervising strategy to mitigate the fault and provide fault tolerance in the root cause analysis.

20. A computerized system comprising:
a processor; and
a non-transitory computer storage medium storing computer-useable instructions that, when used by the processor, cause the processor to:
provide, by a strategy manager, a supervising strategy for root cause analysis of a distributed system to a plurality of child devices, each child device comprising a diagnostic model, an actor instance, and the supervising strategy;
enable communications, via an actor messaging protocol of the actor instance that is isolated from the diagnostic model, for the plurality of child devices, the communications comprising calculations made by the diagnostic model;
based on the communications received via the actor messaging protocol, identify a fault in the root cause analysis for a child device of the plurality of child devices, the fault indicating missing calculations or a failed or disconnected child device; and
apply the supervising strategy to restart calculations, manage device shutdown of the child device, or move calculation execution from the child device to another child device of the plurality of child devices device.

* * * * *